(12) United States Patent
Nugent (10) Patent No.: US 8,207,836 B2
(45) Date of Patent: Jun. 26, 2012

(54) OVERHEAD OBSTACLE AVOIDANCE SYSTEM

(76) Inventor: Frank Nugent, Irvington, NY (US)

( * ) Notice: Subject to any disclaimer, the term of this patent is extended or adjusted under 35 U.S.C. 154(b) by 0 days.

(21) Appl. No.: 13/292,558

(22) Filed: Nov. 9, 2011

(65) Prior Publication Data

US 2012/0081218 A1    Apr. 5, 2012

Related U.S. Application Data

(63) Continuation-in-part of application No. 12/489,879, filed on Jun. 23, 2009.

(51) Int. Cl.
*B60Q 1/00* (2006.01)
*G08G 1/00* (2006.01)
*G01S 3/80* (2006.01)

(52) U.S. Cl. ........ 340/435; 340/901; 340/903; 340/905; 340/943; 367/13; 367/106; 367/909; 180/167

(58) Field of Classification Search ................ 340/435, 340/903, 905
See application file for complete search history.

(56) References Cited

U.S. PATENT DOCUMENTS

| | | | |
|---|---|---|---|
| 4,477,184 A * | 10/1984 | Endo | 356/141.1 |
| 4,621,252 A * | 11/1986 | Johns et al. | 340/905 |
| 4,872,051 A | 10/1989 | Dye | |
| 5,389,912 A * | 2/1995 | Arvin | 340/435 |
| 6,896,082 B2 * | 5/2005 | Asanuma et al. | 180/169 |
| 6,933,837 B2 | 8/2005 | Gunderson et al. | |
| 2004/0183661 A1* | 9/2004 | Bowman | 340/435 |
| 2005/0073433 A1 | 4/2005 | Gunderson et al. | |
| 2008/0077327 A1 | 3/2008 | Harris et al. | |

OTHER PUBLICATIONS nternational Search Report and Written Opinion received in PCT/US2011/060129, mailed Feb. 29, 2012.

* cited by examiner

*Primary Examiner* — Donnie Crosland

(74) *Attorney, Agent, or Firm* — McNees Wallace & Nurick, LLC (57) ABSTRACT

A vehicular collision avoidance system includes a sensor mounted on a vehicle, wherein the sensor is operative to measure the distance between an overhead obstacle ahead of the vehicle and the sensor; a processor connected to the sensor; means for determining a reference height which is the height above ground level at which the sensor is mounted on the vehicle, and wherein the reference height is entered into the processor; means for determining the height of the tallest portion of the vehicle above ground level, wherein the height of the tallest portion of the vehicle is also entered into the processor; and wherein the processor adds the reference height to the distance between the obstacle and the sensor to determine a measured height of the obstacle. The processor produces an alarm if the measured height of the obstacle is less than the height of the tallest portion of the vehicle.

20 Claims, 6 Drawing Sheets

OVERHEAD OBSTACLE AVOIDANCE SYSTEM

CROSS-REFERENCE TO RELATED APPLICATIONS

This patent application is a continuation-in-part of U.S. patent application Ser. No. 12/489,879 filed on Jun. 23, 2009 and entitled "Overhead Obstacle Avoidance System", the disclosure of which is hereby incorporated by reference herein in its entirety and made part of the present utility patent application for all purposes.

BACKGROUND OF THE INVENTION

The described invention relates in general to an obstacle detection system for use with vehicles, and more specifically to an overhead obstacle detection and avoidance system that includes an ultrasonic sensor and processing unit for determining the height of an overhead obstacle and comparing that height to the maximum height of a vehicle.

Large trucks and tractor-trailer units are commonplace in modern society and are used on a daily basis for transporting a multitude of items from one place to another. The highway system in the United States as well as in most other countries includes numerous bridges and overpasses that may create difficulties for the operators of trucks and tractor-trailer units due to the fact that the height of some vehicles exceeds the clearance required to safely travel under these obstacles. If a truck or tractor-trailer unit exceeds the required clearance of a bridge or overpass, and the operator of the vehicle is not able to make that determination prior to encountering the obstacle, a collision will occur. These collisions often result in extensive damage to both the vehicle and the section of the roadway involved. The operator of the vehicle, the operators of other vehicles on the affected section of road, and even pedestrians crossing a bridge or overpass may also be injured or even killed.

Despite the problems described above, few systems for allowing vehicles such as trucks or tractor-trailer units to avoid collision with overhead obstacles are commercially available. Many previously developed systems are either prohibitively expensive to install, are prohibitively difficult to use, or are only somewhat effective for their intended purpose. Thus, there is an ongoing need for a reliable, relatively inexpensive and easy to install detection system for allowing large (i.e., tall) vehicles to avoid costly and dangerous collisions with overhead obstacles such as bridges and overpasses.

SUMMARY OF THE INVENTION

The following provides a summary of certain exemplary embodiments of the present invention. This summary is not an extensive overview and is not intended to identify key or critical aspects or elements of the present invention or to delineate its scope.

In accordance with one aspect of the present invention, a collision avoidance system for use with tall vehicles such as trucks is provided. This system includes at least one sensor mounted on a vehicle, wherein the sensor is operative to measure the overhead distance between an (potential) obstacle above of the vehicle and the sensor itself; at least one processor in electrical communication with the sensor, wherein the processor is accessible by an operator of the vehicle; means for determining a reference height, wherein the reference height is the height above ground level at which the sensor is mounted on the vehicle, and wherein the reference height is entered into the processor; means for determining the height of the tallest portion of the vehicle above ground level, wherein the height of the tallest portion of the vehicle above ground level is entered into the processor; and wherein the processor adds the reference height to the overhead distance between the potential obstacle and the sensor to determine a measured height of the overhead obstacle, wherein the processor produces an alarm if the measured height of the overhead obstacle is less than the height of the tallest portion of the vehicle above ground level, and wherein the sensor does not begin to take new overhead distance measurements for a predetermined period of time after an alarm has been produced or until after the system has been reset.

In accordance with another aspect of the present invention, a system for preventing the collision of a vehicle with an overhead obstacle is provided. This system includes: at least one ultrasonic transducer mounted on a vehicle, wherein the ultrasonic transducer is operative to measure the overhead distance between an obstacle above of the vehicle and the ultrasonic transducer itself; at least one processor in electrical communication with the ultrasonic transducer, wherein the processor is accessible by an operator of the vehicle; means for determining a reference height, wherein the reference height is the height above ground level at which the sensor is mounted on the vehicle, and wherein the reference height is entered into the processor; means for determining the height of the tallest portion of the vehicle above ground level, wherein the height of the tallest portion of the vehicle above ground level is entered into the processor; and wherein the processor adds the reference height to the overhead distance between the obstacle and the ultrasonic transducer to determine a measured height of the overhead obstacle, wherein the processor produces an alarm if the measured height of the overhead obstacle is less than the height of the tallest portion of the vehicle above ground level, and wherein the ultrasonic transducer does not begin to take new overhead distance measurements for a predetermined period of time after an alarm has been produced or until after the system has been reset.

In yet another aspect of this invention, a method for preventing the collision of a vehicle with an overhead obstacle is provided. This method includes mounting a sensor unit on a vehicle, wherein the sensor unit is in electrical communication with a processing unit; and wherein the processing unit is accessible by an operator of the vehicle; determining a reference height, wherein the reference height is the height above ground level at which the sensor unit is mounted on the vehicle; inputting the reference height into the processing unit; determining the height of the tallest portion of the vehicle above ground level; inputting the height of the tallest portion of the vehicle above ground level into the processing unit; using the sensor unit to measure the overhead distance between the lowest portion of an obstacle and the sensor unit; using the processing unit to determine a measured height of the overhead obstacle, wherein the measured height of the overhead obstacle is the reference height added to the distance between the overhead obstacle and the sensor unit; and producing an alarm if the measured height of the overhead obstacle is less than the height of the tallest portion of the vehicle above ground level. The sensor does not begin to take new overhead distance measurements for a predetermined period of time after an alarm has been produced or until after the system has been reset.

Additional features and aspects of the present invention will become apparent to those of ordinary skill in the art upon reading and understanding the following detailed description of the exemplary embodiments. As will be appreciated by the skilled artisan, further embodiments of the invention are possible without departing from the scope and spirit of the invention. Accordingly, the drawings and associated descriptions are to be regarded as illustrative and not restrictive in nature.

BRIEF DESCRIPTION OF THE DRAWINGS

The accompanying drawings, which are incorporated into and form a part of the specification, schematically illustrate one or more exemplary embodiments of the invention and, together with the general description given above and detailed description given below, serve to explain the principles of the invention, and wherein.

DETAILED DESCRIPTION OF THE INVENTION

Exemplary embodiments of the present invention are now described with reference to the Figures. Reference numerals are used throughout the detailed description to refer to the various elements and structures. In other instances, well-known structures and devices are shown in block diagram form for purposes of simplifying the description. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

The present invention relates generally to detection systems for use with tall vehicles such as trucks and tractor-trailer units for detecting and avoiding a stationary object such as a bridge or overpass located above a road. The present invention is essentially a two-part system that includes an exterior sensor component and an interior processing and control component. The exterior sensor component is typically mounted on the side mirror frame of a truck, tractor-trailer unit, or other tall and/or large vehicle. The interior control component is in electrical communication with the exterior sensor component and typically includes a digital controller unit that can be programmed with the height of the exterior sensor component and the height of the trailer that is being pulled or the truck that is being driven. When the vehicle approaches a potential obstacle or hazard, the operator of the vehicle slowly pulls the front portion (i.e., cab) of the vehicle under the hazard and activates the overhead obstacle detection system of the present invention. The height of the obstacle relative to the height of the trailer is determined and reported to the vehicle's operator. If the obstacle is lower than an acceptable height, and alarm sounds and the operator may avoid moving any farther forward. In this manner, the vehicle's operator may avoid serious damage to the vehicle and/or the obstacle. This system addresses the problem of hazards, i.e. bridges, trestles, trees, that are unmarked or mismarked, or areas where new asphalt has been added (up to several inches) to the road bed and the height signs (i.e. 12", 12' 6") have not been changed accordingly. As previously indicated, a first general embodiment of this invention provides a collision avoidance system for use with moving vehicles; a second general embodiment of this invention provides a system for preventing the collision of a moving vehicle with an overhead obstacle; and a third general embodiment of this invention provides a method for preventing the collision of a moving vehicle with an overhead obstacle. With reference now to the Figures, one or more specific embodiments of this invention shall be described in greater detail.

Figure 1:
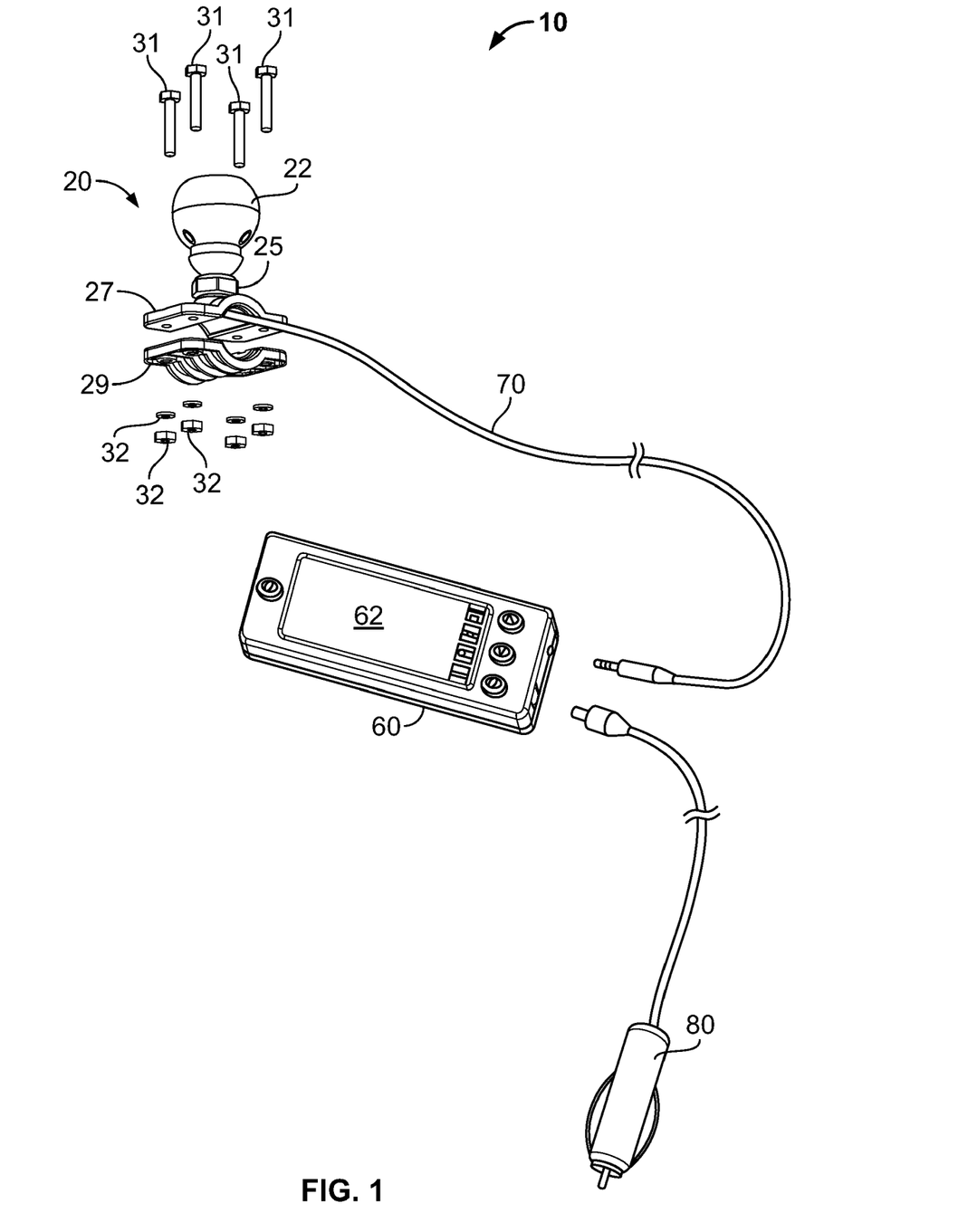
FIG. 1 is a semi-exploded view of an exemplary embodiment of the obstacle detection system of the present invention showing the exterior portions of the individual components thereof.
Figure 2:
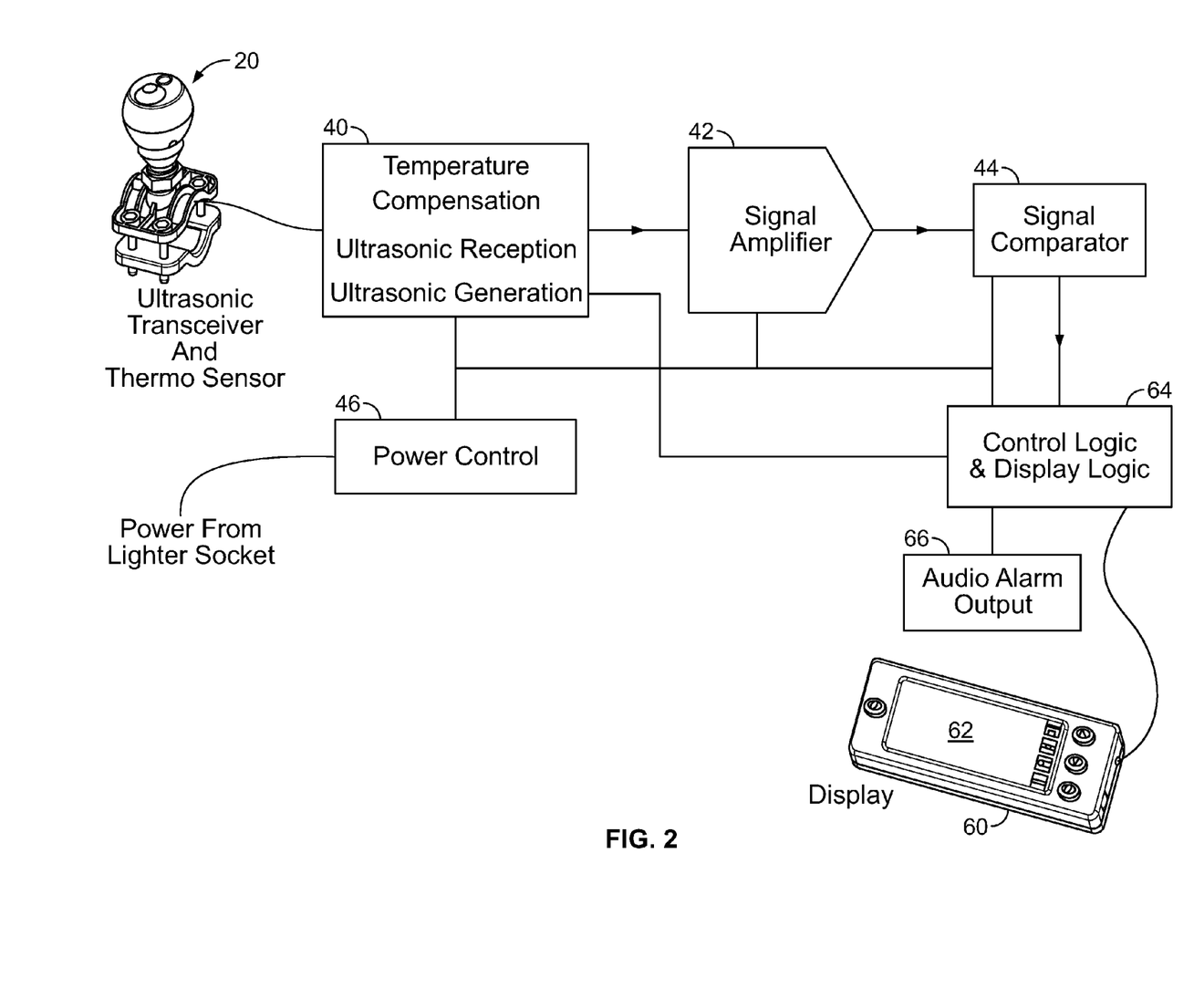
FIG. 2 is a simplified schematic of an exemplary embodiment of the obstacle detection system of the present invention detailing certain functional aspects of system.
Figure 3:
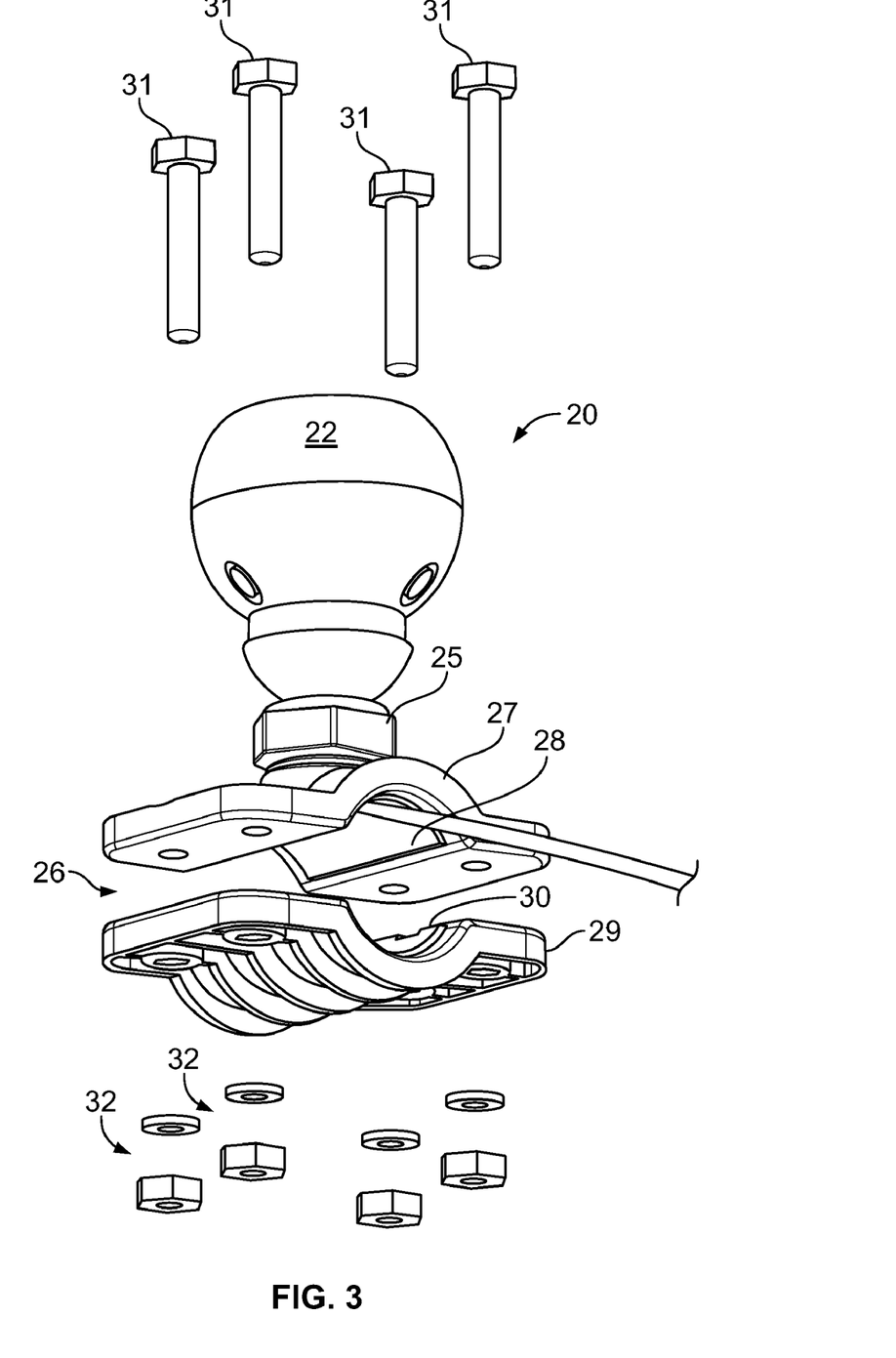
FIG. 3 is a semi-exploded view of the sensor assembly component of the obstacle detection system of FIG. 1.
Figure 4:
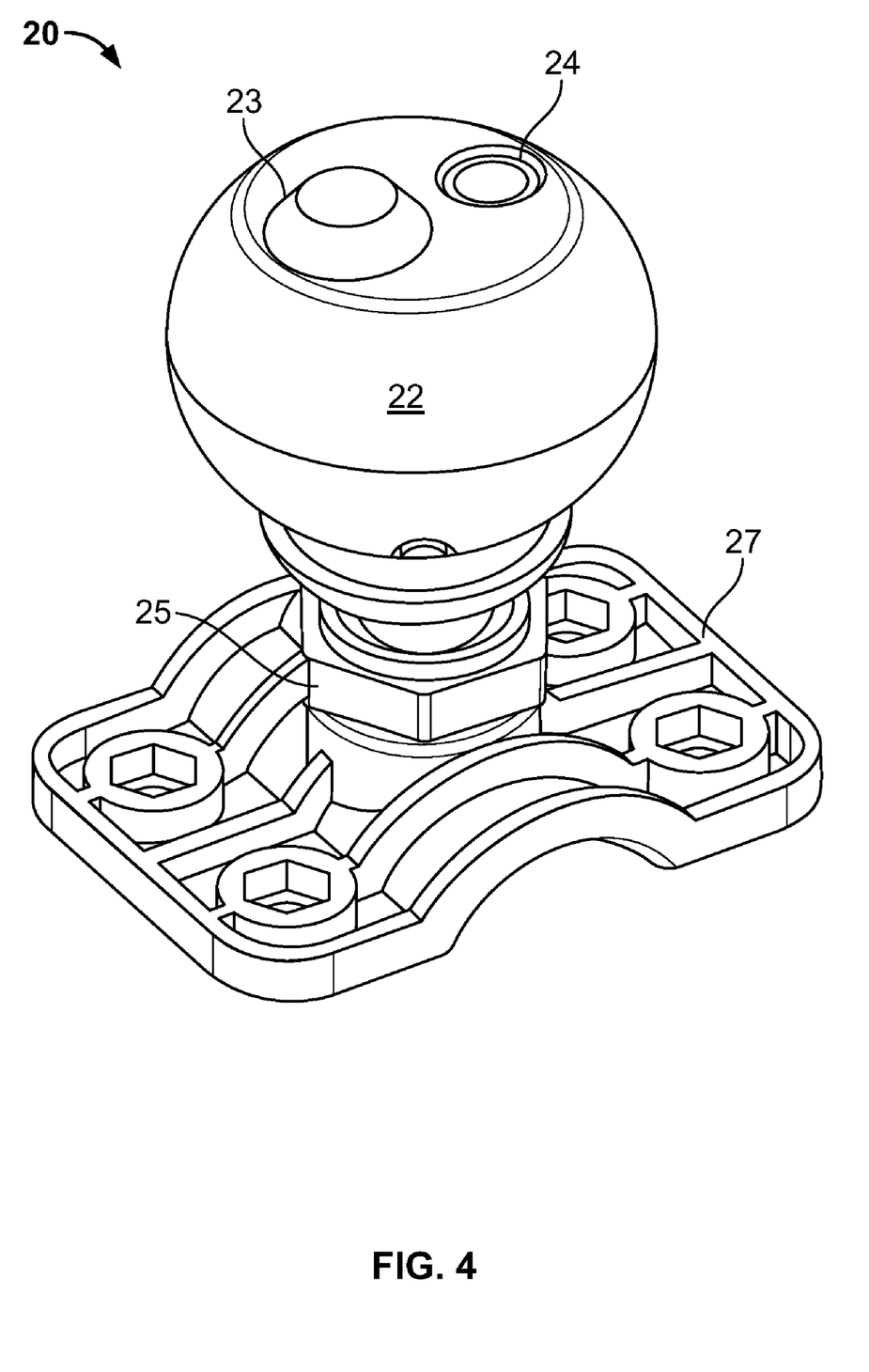
FIG. 4 is a top view of the sensor assembly component of the obstacle detection system of FIG. 1.
Figure 5:
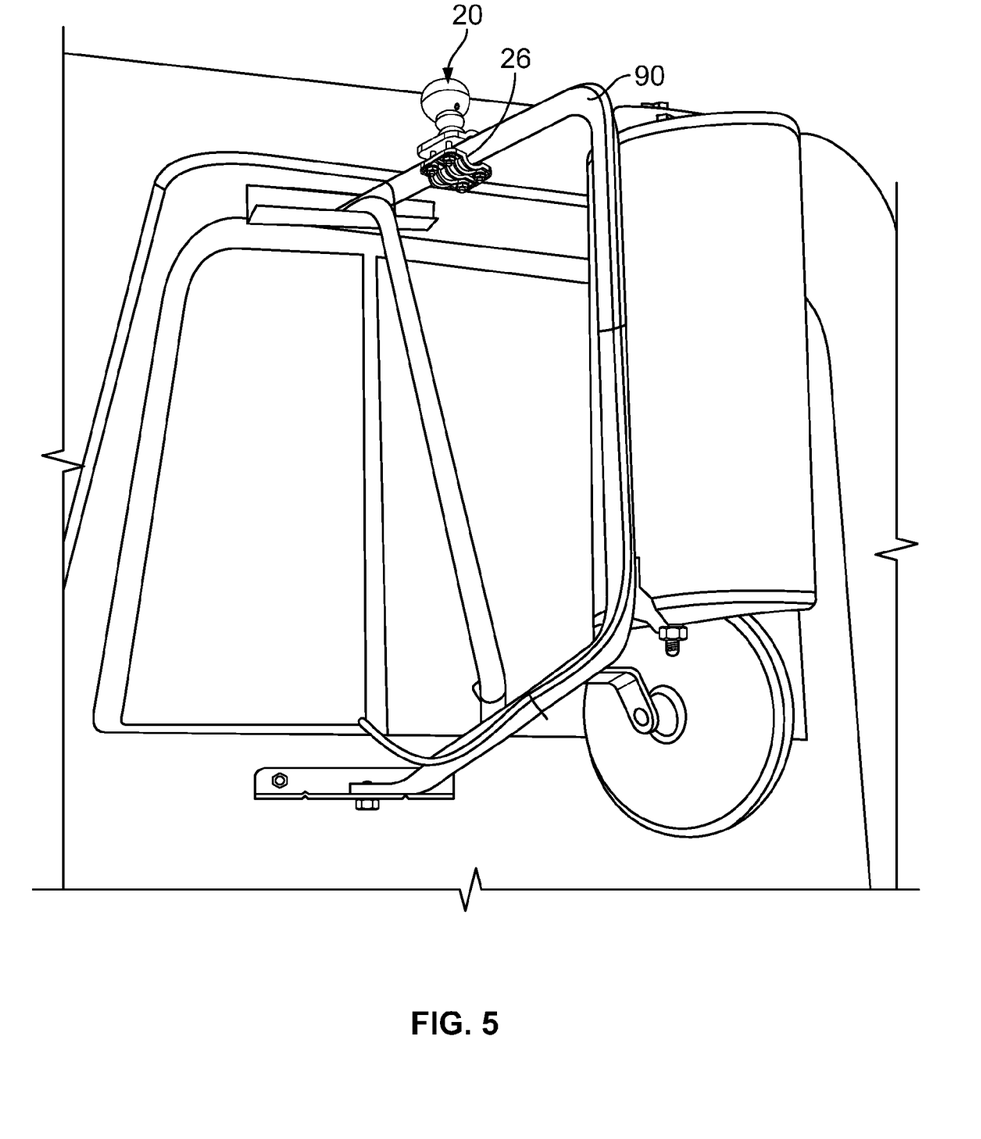
FIG. 5 is an illustration showing the sensor assembly component of the obstacle detection system of FIG. 1 mounted on the mirror support of a truck cab.

With reference to FIGS. 1-6, an exemplary embodiment of obstacle avoidance system 10 includes sensor assembly 20, which is in electrical communication with processor 60. As best shown in FIGS. 3-4, sensor assembly 20 further includes sensor body 22, which houses sensor 23 and level 24. Holding nut 25 attaches sensor body 22 to sensor base 26, which includes top clamping portion 27 and bottom clamping portion 29. Top gasket 28 and bottom gasket 30 are included in sensor base 26 for purposes of stabilizing sensor assembly on mirror support 90 (see FIG. 5). Bolts 31 and washers and nuts 32 are used to attach sensor base 26 to mirror support 90. As best shown in FIG. 2, processor 60 includes LED display 62 (or another type of display), control and display logic 64, and audio alarm output 66 and may also include temperature compensation module 40, signal amplifier 24, signal comparator 44, and power control 46. Connector cable 70, which is typically a coaxial cable, is used to connect sensor assembly 20 to processor 60. Connector cable 70 may be provided in a variety of different lengths to accommodate different vehicle types, sizes, and dimensions. Connector cables of 8 feet (2.44 meters), 12 feet (3.68 meters), or 16 feet (4.88 meters) are compatible with this invention and other lengths are possible. In some embodiments, connector cable 70 includes quick-connectors, which permit cables of different lengths to be easily substituted for one another, as needed. Power adaptor 80 is typically plugged into the cigarette lighter inside the cab of a vehicle and provides a source of electrical power to obstacle avoidance system 10.

In the exemplary embodiment of the present invention shown in the Figures, sensor 23 is an ultrasonic sensor, and preferably an ultrasonic transducer. Ultrasonic sensors are known as transducers when they both send and receive and work on a principle similar to radar or sonar which evaluates attributes of a target by interpreting the echoes from radio or sound waves respectively. Ultrasonic sensors generate high frequency sound waves and evaluate the echo which is received back by the sensor. Sensors calculate the time interval between sending the signal and receiving the echo to determine the distance to an object. Systems typically use a transducer which generates sound waves in the ultrasonic range, above 20,000 hertz, by turning electrical energy into sound, then upon receiving the echo turn the sound waves into electrical energy which can be measured and displayed. Ultrasonic transducers send and receive waves for many types of sensing. Examples include distance, proximity, level, non-destructive evaluation, web break detection, counting, and security applications. They typically operate at their resonant frequency with various construction options, beam patterns, and power levels.

Ultrasonic transducers come in different styles for different applications and a variety of such transducers are compatible with the present invention. For example, plain general-purpose transducers, including air transducers, are available with no specialized features. More specialized styles are common as well, such as contact transducers for placing directly on the surface to be measured. Dual element transducers have two elements in the transducer housing and allow the transmitter and receiver to operate independently. The elements are angled toward each other to create a reflective transmit/receive pathway. Angle beam transducers include mounted transparent angle blocks and are often used for weld inspection and flaw detection. They typically utilize refracted shear waves to detect flaws throughout the depth of welded areas. Immersible transducers are designed to be totally submerged in a liquid medium, most often fresh water. The protected element style has the transducer element protected for use on rough surfaces. Delay line transducers are versatile, often with replaceable head options such as membranes and wear caps. They are used to gage or detect flaws such as delaminations in thin materials. Shear wave transducers introduce shear waves into material without using an angle beam wedge. The ratio of shear wave components to longitudinal components can exceed 30 dB. Medical style transducers and housings are designed for specific medical applications. Common features available for ultrasonic transducers are array configuration for connecting more than one transducer in series or parallel; temperature compensation circuitry that compensates for sensitivities changing with ambient temperature; and optional analog output. Most transducers output analog voltage, but may have provisions for current loop output, etc. Ultrasonic transducers that are potentially compatible with the present invention may be obtained from a variety of commercial sources such as Maxbotics (EZ0-4), Robotic Electronics/Devantech (SRF10, SRF08, SRF04, and SR235), Idec (SA6A), ASL/Seiz & Viscarret (Usonic), and Sonaswitch (MiniA and MiniS). A variety of other ultrasonic devices are potentially compatible with obstacle avoidance system 10.

As will be appreciated by one of ordinary skill in the art, processor 60 may be any of a variety of commercially available or custom built signal processing units or central processing units that include signal processing capabilities as well as data processing and system control modules (see FIG. 2) In an exemplary embodiment, the operation range of the system is about 0.4 meter (+/−0.1 meter tolerance) to about 5 meters (16.4 feet). In other embodiments, the upper limit of the operational range of the system is about 6 meters (20 feet) or about 7.5 meters (25 feet). Other operational parameters are possible. Features generally provided with or in the system include (i) a programmable distance for alarm signal; (ii) a programmable offset (subtraction) to compensate for mounting position; (iii) display type: LED display for feet, inches convertible English/metric units; (iv) power requirements: 12 V DC with female jack for DC power on display unit; (v) operating current: 30 mA (based on desired brightness of LED); (vi) interface: user keys for setting height, alarm position, English/metric mode; (vii) installing distance between sensor and display: 3 to 6 feet horizontally; and (ix) material: ABS plastic and various metals. Specifications for an exemplary interior control (display) unit are as follows: (i) operating voltage: 12V DC; (ii) operating temperature: −10° C. to 60° C.; (iii) controller: microprocessor; (iv) weight: approximately 150 grams. Specifications for an exemplary exterior (sensor) unit are as follows: (i) operating voltage: 12 V DC; (ii) operating temperature: −10° C.-+60° C.; (iii) sensor: ultrasonic transducer; (iv) dimensions: baffle unit for sensor housing shown in FIG. 1; (v) weight: approximately 120 grams. Other system and component specifications are possible.

Figure 6:
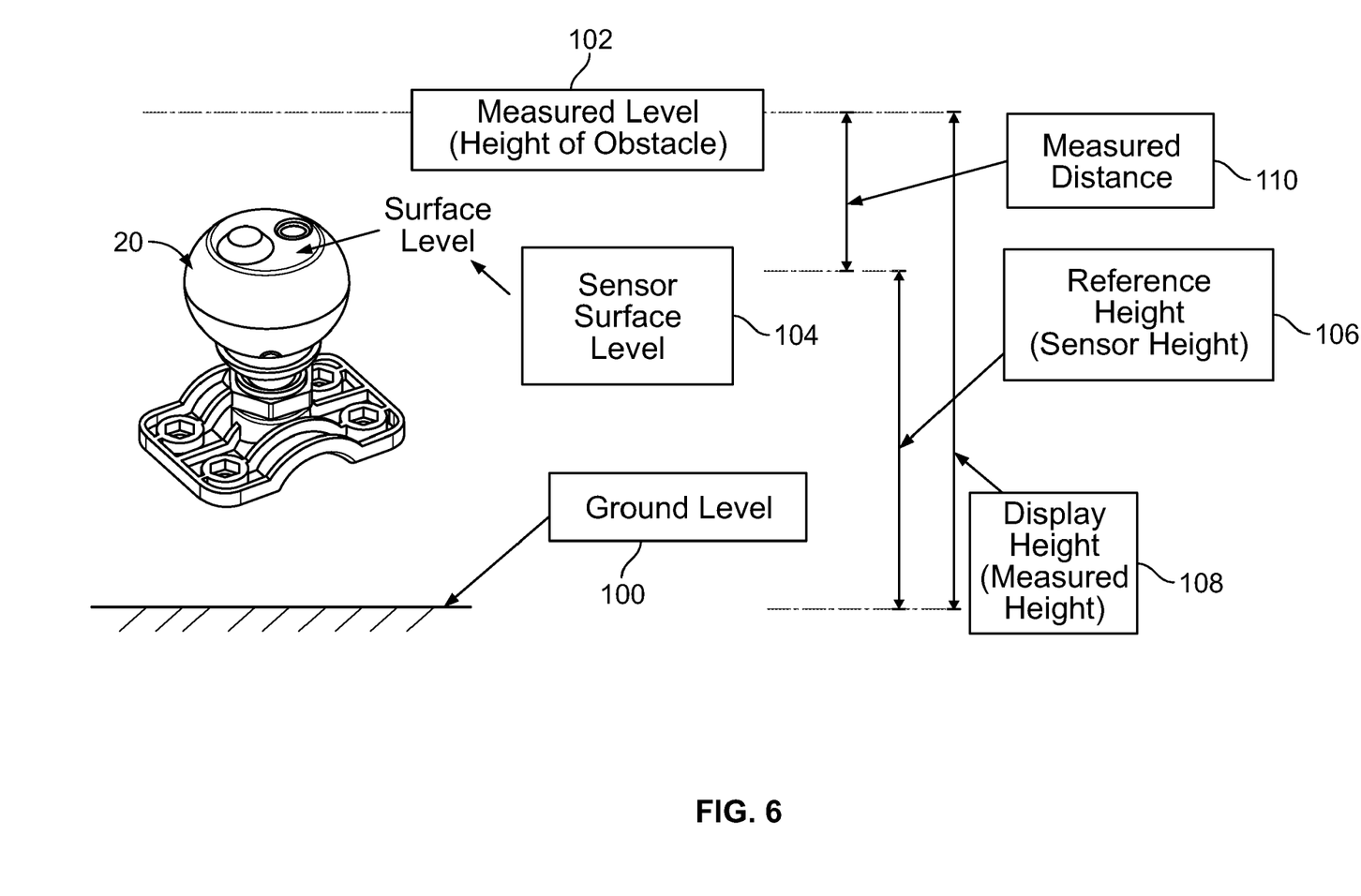
FIG. 6 is block diagram illustrating the various heights measured and calculated by the obstacle detection system of the present invention.

With reference to FIG. 6, obstacle avoidance system 10 may be used according the following exemplary method. Using sensor base 26, sensor assembly 20 is mounted on the exterior of a vehicle in a location that allows sensor 23 to have a clear and unobstructed view (i.e., no impediments or blockages 45° from vertical). No portion of the vehicle on which sensor assembly 20 is mounted should block the signal path of sensor 23. Sensor assembly 20 is then connected to processor 60 with connector cable 70, which may be routed into the interior of the vehicle through a window vent or other access point. Processor 60 is mounted inside the vehicle where it is easily visible and accessible by the operator of the vehicle. The height above ground level 100 at which sensor 23 (sensor surface level 104) is mounted is measured (e.g., manually) to determine reference height 106. Reference height 106 is then manually entered into processor 60. The tallest portion above ground level 100 of the vehicle in which obstacle avoidance system 10 is installed is measured (e.g., manually or reference to printed height on vehicle or owner's manual) and entered into processor 60. As the vehicle slowly moves under an overhead item (i.e., a potential obstacle), sensor 23 is used to measure the overhead distance between the bottom of the overhead obstacle and the sensor itself. This distance is referred to as measured distance 110, which is then stored in processor 60. Processor 60 is then used to calculate a measured height 108 of the obstacle, which is displayed by LED 62. Measured height 108 is reference height 106 added to measured distance 110. A visual and/or audible alarm is produced if the measured height 108 of the overhead obstacle is less than the height of the tallest portion (e.g., the trailer or portion of the vehicle behind the cab) of the vehicle above ground level 100. In this manner, the operator of a vehicle in which obstacle avoidance system 10 has been installed may avoid a collision with an overhead obstacle that is lower than the maximum height of the vehicle. In an exemplary embodiment, obstacle avoidance system 10 remains active while the cab portion of the vehicle passes completely under the overhead item and automatically shuts off when the potential obstacle has been cleared. Obstacle avoidance system 10 typically remains active for one minute as the cab portion of the vehicle passes completely under the obstacle. Another full minute of sensor activity can be obtained when the operator manually activates the sensor. During normal operation, the driver pushes an "on" button and obstacle avoidance system 10 measures for one minute and then shuts off. During that initial minute, the operator may push the on button again at any time to engage the system for another minute. In another exemplary embodiment, audio alarm output 66 produces an alarm and LED 62 flashes if the height read by the sensor 23 is lower than reference height 106. For example, if the height programmed into the unit is 13'0" and the actual height of the obstacle is displayed as 13'1", LED 62 will show a constant 13'1". If LED 62 reads 13'0" or below, the readout will blink on and off and the alarm will sound.

In one embodiment of the present invention, when obstacle avoidance system 10 detects an overhead obstacle, the height of which is lower than the height of the tallest portion above ground level 100 of the vehicle in which obstacle avoidance system 10 is installed, the visual and audible alarms sound and the system locks into the lower height. Upon locking into the lower height, the sensor stops taking measurements until the obstacle has been cleared and the unit has been manually reset by the user or until after a preprogrammed time delay (e.g., 3-4 seconds) has passed. Preventing obstacle avoidance system 10 from automatically resetting and beginning to take new overhead distance measurements provides a driver or operator with more time to become aware of a potentially dangerous overhead obstacle and respond accordingly. In this and other embodiments, the volume of the audible warning can be set to a level that allows it to be easily heard over the engine sound generated by the vehicle when being driven.

While the present invention has been illustrated by the description of exemplary embodiments thereof, and while the embodiments have been described in certain detail, it is not the intention of the Applicant to restrict or in any way limit the scope of the appended claims to such detail. Additional advantages and modifications will readily appear to those skilled in the art. Therefore, the invention in its broader aspects is not limited to any of the specific details, representative devices and methods, and/or illustrative examples shown and described. Accordingly, departures may be made from such details without departing from the spirit or scope of the applicant's general inventive concept.

What is claimed:

1. A collision avoidance system for use with vehicles, comprising:
   (a) at least one sensor mounted on a vehicle, wherein the sensor is operative to measure the overhead distance between an obstacle above the vehicle and the sensor itself;
   (b) at least one processor in electrical communication with the sensor, wherein the processor is accessible by an operator of the vehicle;
   (c) a predetermined reference height, wherein the reference height is the height above ground level at which the sensor is mounted on the vehicle, and wherein the reference height is entered into the processor;
   (d) a predetermined height for the tallest portion of the vehicle above ground level, wherein the height of the tallest portion of the vehicle above ground level is entered into the processor;
   (e) wherein the processor adds the reference height to the overhead distance between the obstacle and the sensor to calculate a measured height of the overhead obstacle, wherein the processor produces an alarm if the measured height of the overhead obstacle is less than the height of the tallest portion of the vehicle above ground level, and
   (f) wherein the sensor does not begin to take new overhead distance measurements for a predetermined period of time after an alarm has been produced.

2. The system of claim 1, further comprising at least one coaxial cable for connecting the at least one sensor to the at least one processor.

3. The system of claim 1, further comprising a signal amplifier and a signal comparator.

4. The system of claim 1, further comprising a power source for providing electrical power to the at least one sensor and the at least one processor.

5. The system of claim 1, wherein the sensor further includes at least one ultrasonic transducer.

6. The system of claim 1, wherein the sensor further includes temperature compensation means.

7. The system of claim 1, wherein the processor further includes control logic and display logic.

8. The system of claim 1, wherein the processor further includes an LED display.

9. The system of claim 1, wherein the moving vehicle is a truck or a tractor-trailer unit.

10. The system of claim 1, wherein the ultrasonic transducer further includes temperature compensation means.

11. The system of claim 1, wherein the processor further includes control logic and display logic, and wherein the processor further includes an LED display.

12. The system of claim 1, wherein the moving vehicle is a truck or a tractor-trailer unit.

13. A system for preventing the collision of a vehicle with an overhead obstacle, the system comprising:
   (a) at least one ultrasonic transducer mounted on a vehicle, wherein the ultrasonic transducer is operative to measure the overhead distance between an obstacle above the vehicle and the ultrasonic transducer itself;
   (b) at least one processor in electrical communication with the ultrasonic transducer, wherein the processor is accessible by an operator of the vehicle;
   (c) a predetermined reference height, wherein the reference height is the height above ground level at which the sensor is mounted on the vehicle, and wherein the reference height is entered into the processor;
   (d) a predetermined height for the tallest portion of the vehicle above ground level, wherein the height of the tallest portion of the vehicle above ground level is entered into the processor;
   (e) wherein the processor adds the reference height to the overhead distance between the obstacle and the ultrasonic transducer to calculate a measured height of the overhead obstacle, and wherein the processor produces an alarm if the measured height of the overhead obstacle is less than the height of the tallest portion of the vehicle above ground level; and
   (f) wherein the ultrasonic transducer does not begin to take new overhead distance measurements for a predetermined period of time after an alarm has been produced.

14. The system of claim 13, further comprising at least one coaxial cable for connecting the at least one ultrasonic transducer to the at least one processor.

15. The system of claim 13, further comprising a signal amplifier and a signal comparator.

16. The system of claim 13, further comprising a power source for providing electrical power to the at least one ultrasonic transducer and the at least one processor.

17. A method for preventing the collision of a vehicle with an overhead obstacle, the method comprising:
   (a) mounting a sensor unit on a vehicle, wherein the sensor unit is in electrical communication with a processing unit; and wherein the processing unit is accessible by an operator of the vehicle;
   (b) determining a reference height, wherein the reference height is the height above ground level at which the sensor unit is mounted on the vehicle;
   (c) inputting the reference height into the processing unit;
   (d) determining the height of the tallest portion of the vehicle above ground level;
   (e) inputting the height of the tallest portion of the vehicle above ground level into the processing unit;
   (f) using the sensor unit to measure the overhead distance between an obstacle and the sensor unit;
   (g) using the processing unit to calculate a measured height of the overhead obstacle, wherein the measured height of the overhead obstacle is the reference height added to the distance between the overhead obstacle and the sensor unit; and
   (h) producing an alarm if the measured height of the overhead obstacle is less than the height of the tallest portion of the vehicle above ground level, wherein the sensor unit does not begin to take new overhead distance measurements for a predetermined period of time after an alarm has been produced.

18. The method of claim 17, wherein the sensor unit further includes at least one ultrasonic transducer.

19. The method of claim 17, wherein the sensor unit further includes temperature compensation means.

20. The method of claim 17, wherein the processor further includes control logic and display logic, and wherein the processor further includes an LED display.

* * * * *